United States Patent
Onuki

(10) Patent No.: US 8,793,408 B2
(45) Date of Patent: Jul. 29, 2014

(54) ELECTRONIC DEVICE AND PROGRAM

(75) Inventor: Masao Onuki, Machida (JP)

(73) Assignee: Nikon Corporation, Tokyo (JP)

( * ) Notice: Subject to any disclaimer, the term of this patent is extended or adjusted under 35 U.S.C. 154(b) by 237 days.

(21) Appl. No.: 13/328,747

(22) Filed: Dec. 16, 2011

(65) Prior Publication Data

US 2012/0159032 A1 Jun. 21, 2012

(30) Foreign Application Priority Data

Dec. 21, 2010 (JP) ................................. 2010-284591

(51) Int. Cl.
*G06F 13/38* (2006.01)
*G06F 3/14* (2006.01)

(52) U.S. Cl.
CPC .. *G06F 3/14* (2013.01); *G06F 13/38* (2013.01)
USPC ................ 710/16; 710/14; 710/104; 710/305

(58) Field of Classification Search
USPC ........................................................ 710/313
See application file for complete search history.

(56) References Cited

U.S. PATENT DOCUMENTS

| | | | |
|---|---|---|---|
| 7,075,568 B2 * | 7/2006 | Aizawa | 348/211.99 |
| 7,856,104 B2 * | 12/2010 | Douillet | 380/223 |
| 8,037,342 B2 * | 10/2011 | Kimoto | 714/4.1 |
| 8,090,030 B2 * | 1/2012 | Kim et al. | 375/240.28 |
| 8,189,118 B2 * | 5/2012 | Abe | 348/730 |
| 8,255,202 B2 * | 8/2012 | Lida et al. | 703/25 |
| 8,453,008 B2 * | 5/2013 | Kimoto | 714/4.1 |
| 8,479,227 B2 * | 7/2013 | Douillet | 725/31 |
| 2008/0172504 A1 * | 7/2008 | Kimura et al. | 710/63 |
| 2008/0186403 A1 * | 8/2008 | Douillet | 348/461 |
| 2009/0177820 A1 * | 7/2009 | Ranade et al. | 710/106 |
| 2009/0178097 A1 * | 7/2009 | Kim et al. | 725/114 |
| 2010/0003016 A1 * | 1/2010 | Ishimaru | 386/117 |
| 2010/0017645 A1 * | 1/2010 | Kimoto | 714/4 |
| 2010/0020183 A1 * | 1/2010 | Kimoto et al. | 348/207.11 |
| 2010/0132004 A1 * | 5/2010 | Ota et al. | 725/127 |
| 2011/0304775 A1 * | 12/2011 | Kimoto | 348/723 |
| 2012/0044127 A1 * | 2/2012 | Mashiko | 345/2.2 |
| 2012/0077384 A1 * | 3/2012 | Bar-Niv et al. | 439/625 |
| 2013/0250171 A1 * | 9/2013 | Francis et al. | 348/461 |

FOREIGN PATENT DOCUMENTS

| | | |
|---|---|---|
| JP | A-2002-133406 | 5/2002 |
| JP | A-2008-187536 | 8/2008 |
| JP | A-2010-11427 | 1/2010 |

OTHER PUBLICATIONS

Nov. 27, 2012 Notification of Reason(s) for Refusal issued in Japanese Patent Application No. 2011-277941 (with English-language translation).

* cited by examiner

*Primary Examiner* — Ryan Stiglic

(74) *Attorney, Agent, or Firm* — Oliff PLC

(57) ABSTRACT

An electronic device provided with a multimedia interface having a cross-device control function and a general-purpose serial bus interface is provided with a control unit that prohibits the use of the cross-device control function whenever an external device is connected via the general-purpose serial bus interface during a state permitting control by the cross-device control function from an image display device connected via the multimedia interface.

8 Claims, 4 Drawing Sheets

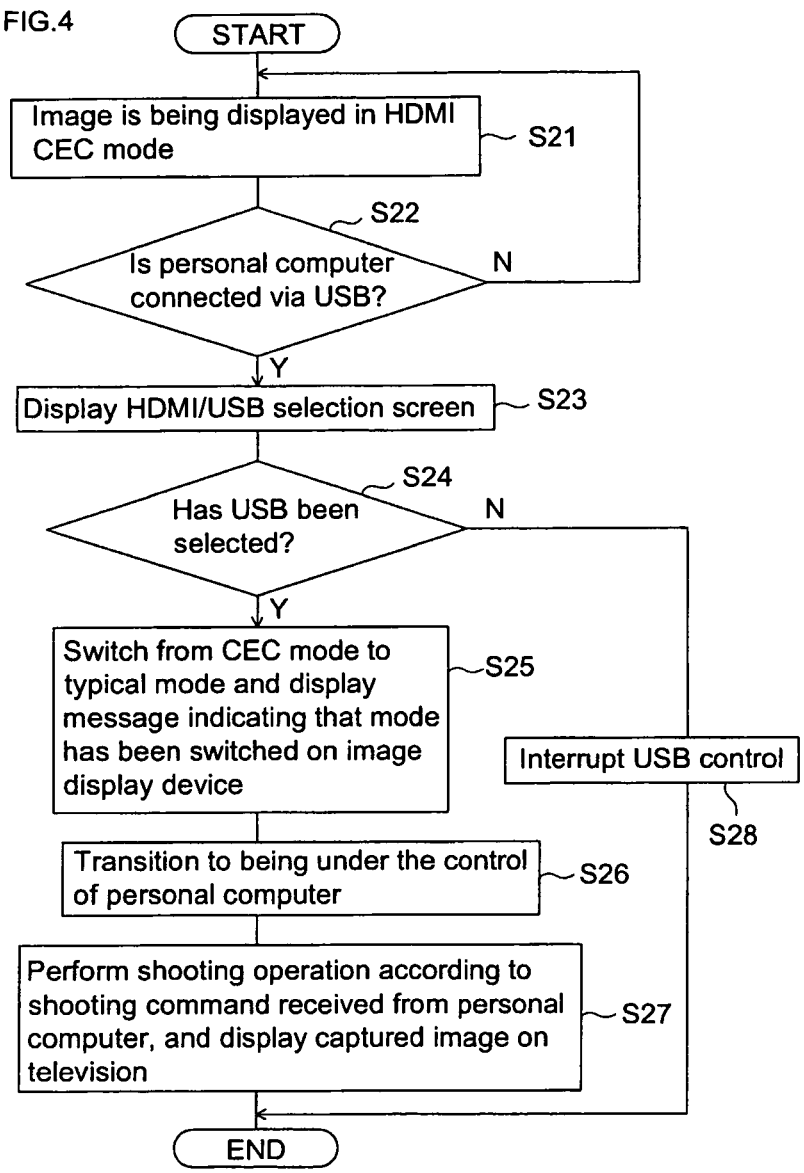

ELECTRONIC DEVICE AND PROGRAM

CROSS-REFERENCE TO RELATED APPLICATIONS

The disclosure of the following priority applications is herein incorporated by reference:

Japanese Patent Application No. 2010-284591 filed on Dec. 21, 2010.

TECHNICAL FIELD

The present invention relates to an electronic device and a program.

BACKGROUND ART

Digital cameras and other image recording devices are provided with a USB (Universal Serial Bus) as a general-purpose interface for connections with personal computers and the like. A connection can be created between the image recording device and the personal computer via the USB to transfer captured images (still images or movie images) to the personal computer, control the image recording device from the personal computer, and perform various other shooting operations.

As recited in Patent Document 1 below, in addition to the aforementioned USB, there has also been introduced an image recording device installed with an HDMI (High-Definition Multimedia Interface) (registered trademark) as a multimedia interface. A cable connection for the image recording device can be created via the Hall to a television receiver or other image display devices to display captured images on the display screen of the image display device. Recently there have been efforts to make it such that a, CEC (Consumer Electronics Control) acting as a mutual control function of the HDMI can be used to operate the image recording device from a remote controller associated with, for example, a television receiver.

CITATION LIST

Patent Literature

Patent Literature 1: Japanese Unexamined Patent Application Publication No. 2008-187536

SUMMARY OF INVENTION

Technical Problem

In such an image recording device installed with a plurality of interfaces, such as USB, HDMI and the like, capable of transferring apparatus control signals, in a case where a personal computer connected via the USB and an image display device connected via the HDMI are simultaneously connected with, the image recording device, the state then becomes such that the image recording device can be controlled from a plurality of hosts (the personal computer and the image display device), leading to a situation in which control is complicated. Therefore, conventionally, in a case where, for example, the image recording device is connected to the image display device via the HDMI, then in a case where the personal computer is then connected to the image recording device via the USB, the HDMI control is interrupted (as a similar situation to a case where there is no connection) such that control is possible only from the personal computer. For this reason, the image display device will cease displaying despite the fact that the image recording device is connected to the image display device, which causes the problem of reduced convenience for the user.

It is an object of the present invention to provide an electronic device and a program capable of improving the convenience for the user.

Solution to Problem

In a first aspect of the present invention, an electronic device provided with a general-purpose serial bus interface and a multimedia interface having a cross-device control function is provided with a control unit that prohibits the use of the cross-device control function whenever an external device is connected via the general-purpose serial bus interface during a state permitting control by the cross-device control function from an image display device connected via the multimedia interface.

In a second aspect of the present invention, an electronic device provided with a general-purpose serial bus interface and a multimedia interface having a cross-device control function is provided with a control unit that prohibits the use of the cross-device control function whenever an image display device is connected via the multimedia interface while an external device is connected via the general-purpose serial bus interface.

In a third aspect of the present invention, a program causes a computer to execute, during a state permitting control by the cross-device control function from an image display device connected via a multimedia interface having a cross-device control function, a control step of prohibiting the use of the cross-device control function whenever an external device is connected via a general-purpose serial bus interface.

In a fourth aspect of the present invention, a program causes a computer to execute, whenever an image display device is connected via a multimedia interface having a cross-device control function, a control step of prohibiting the use of the cross-device control function while an external device is connected via a general-purpose serial bus interface.

Advantageous Effects of Invention

According to the present invention, it is possible to improve the convenience for the user.

BRIEF DESCRIPTION OF DRAWINGS

FIG. 4 is a flowchart illustrating a second process in the digital camera of the embodiment of the present invention.

DESCRIPTION OF EMBODIMENTS

Figure 1:
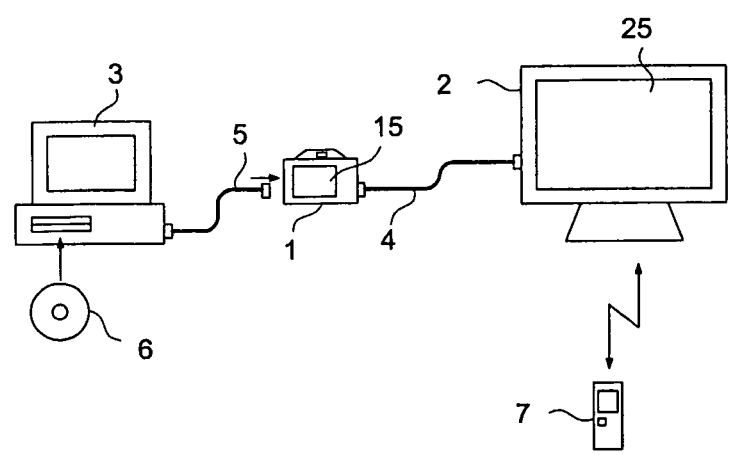
FIG. 1 is a drawing illustrating a schematic of the overall configuration of a system of an embodiment of the present invention.

The following is a detailed description of an embodiment of the present invention, with reference to the accompanying drawings. The system of this embodiment, as illustrated in FIG. 1, is constituted of a digital camera 1 serving as an example of an electronic device; a digital television 2 serving as an example of an image display device; and a personal computer 3 serving as an example of an external device.

Examples of the digital camera 1 can include, but are not particularly limited to, digital cameras of the SLR format. The electronic device is described herein using the example of the digital camera 1, but may also be another electronic device, such as a mobile telephone, a smartphone, or an audio player.

The digital camera 1 is provided with a USB (Universal Serial Bus) serving as a general-purpose serial bus interface, and an HDMI (High-Definition Multimedia Interface) serving as a multimedia interface having a CEC (Consumer Electronics Control) function serving as a cross-device control function. The USB and the HDMI each correspond to hot plugs (hot swaps). In the state in which a power source remains on, a connection with another device is possible, and the digital camera 1 can detect whether or not another device has been connected via the interfaces.

Figure 2:
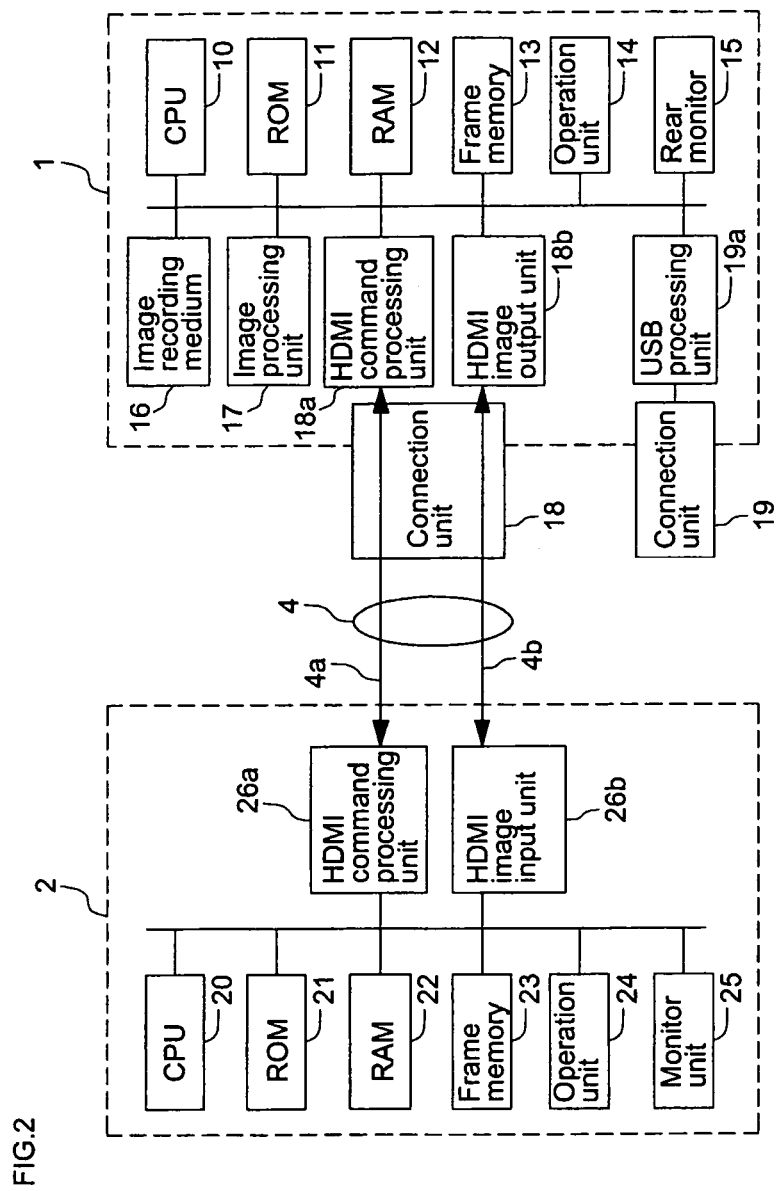
FIG. 2 is a block diagram illustrating a configuration of a digital camera of the embodiment of the present invention.

As illustrated in FIG. 2, the digital camera 1 has a connection unit 18 provided in connection with the digital television 2, and a connection unit 19 provided in connection with the personal computer 3.

The connection unit 18 is an HDMI receptacle and is provided in connection with an HDMI device having a communication interface of the HDMI standard. One end of an HDMI cable 4, which is a communication cable complying with the HDMI standard, is inserted into the connection unit 18. The digital camera 1 operates as an HDMI source in a case where a connection with the digital television 2 is created via the connection unit 18 and the HDMI cable 4. The digital television 2 operates as an HDMI sink. The connection unit 18 is, for example, a type C receptacle of the HDMI standard.

The connection unit 19 is a USB receptacle and is provided in connection with a USB device having a communication interface of the USB standard. One end of a USB cable 5, which is a communication cable complying with the USB standard, is inserted into the connection unit 19. The connection unit 19 is, for example, a micro-B receptacle of the USB standard, is provided in connection with a USB device operating as a host of the USB standard. The digital camera 1 operates as a device of the USB standard in a case where a connection with the personal computer 3 is created via the connection unit 19 and the USB cable 5.

As illustrated in FIG. 1, a mutual connection between the digital camera 1 and the digital television 2 can be created via the HDMI cable 4, whereby an image captured by the digital camera 1 (still image or movie image) can be displayed (for example, still images can be displayed in a slideshow) on a display screen (a monitor unit) 25 of the digital television 2. At such a time, the CEC function of the HDMI can be used to start/stop the image display, command that the frame be advanced (that the next image be displayed), or command otherwise, in accordance with an operation, executed by a user, of, for example, a remote controller 7 associated with the digital television 2.

The connection that can be created between the digital camera 1 and the personal computer 3 via the USB cable 5 permits, for example, tethered shooting in accordance with an application that is executed on the personal computer 3. "Tethered shooting" is imaging performed by the control of the shooting operation of the digital camera 1 in accordance with an operation executed by the user on the personal computer 3 (that is, remote imaging). Image data captured by tethered shooting is, automatically or as needed, transferred to the personal computer 3 and stored in a memory device (a hard disk or the like) (not shown) provided to the personal computer 3.

A program executed by the personal computer 3 (which includes an application for tethered shooting) is provided through a CD-ROM or other recording medium 6 or through the Internet or other electric communication line (not shown), and installed on the personal computer 3. Though an illustration has been omitted, the personal computer 3 is provided with a CPU, a memory, peripheral circuitry, a monitor (display device), a keyboard, a mouse, and the like, and the CPU executes the installed program, whereby the tethered shooting function and other functions are performed.

FIG. 2 illustrates the elements constituting the digital camera 1 and the digital television 2. The HDMI cable 4 forming the mutual connection between the digital camera 1 and the digital television 2, in accordance with the HDMI standard, includes a CEC (Consumer Electronics Control) line 4a, a TMDS (Transition Minimized Differential Signaling) line 4b, and other signal line(s) (not shown). The CEC line 4a is a signal wire adapted to send and receive control commands between the digital camera 1 and the digital television 2, and the TMDS line 4b is a signal wire adapted to transfer image data from the digital camera 1 to the digital television 2.

The digital camera 1 has a CPU 10, a ROM 11, a RAM 12, a frame memory 13, an operation unit 14, a rear monitor 15, an image recording medium 16, an image processing unit 17, the connection unit 18, an HDMI command processing unit 18a, an HDMI image output unit 18b, the connection unit 19, and a USB processing unit 19a. The CPU 10 executes various forms of processing adapted to cause the digital camera 1 to function, by the execution of a control program (which includes a program adapted to perform a first to third process (described later)) stored in the ROM 11. The RAM 12 provides a memory area for work done when the CPU 10 and other elements perform processing. A part of the memory area of the RAM 12 is used as the frame memory 13.

The operation unit 14 includes a release button that can be switched between being half-pressed and pressed; a main switch for turning a primary power source on/off; a command dial; a menu button; a keypad for it selection; an OK button (selection button); a slideshow start button; a button adapted to select various shooting modes; and the like. The user can operate the switches, buttons, and other elements in accordance with a predetermined sequence to provide shooting commands as well as to select or switch between various modes or the like, select or input parameters, and perform other commands associated with imaging.

The rear monitor 15 is provided to the rear of the digital camera 1 and is a display means composed of a liquid crystal panel and adapted to display live view images, captured images, a menu screen for setting various parameters, and the like. The image recording medium 16 is a memory card or other portable element composed of flash memory or the like, and is exchangeably installed in a predetermined slot (not shown) provided to the digital camera 1.

Though an illustration has been omitted, the image processing unit 17 is provided with an imaging sensor, an A/D conversion circuit, an image processing circuit, and the like. The imaging sensor is constituted of a CCD, a CMOS, or the like, and receives and captures light from a subject through a shooting lens and outputs an imaging signal (an analog signal serving as an accumulated charge). The imaging signal outputted from the imaging sensor is converted to a digital signal in the A/D conversion circuit and sent to the image processing circuit. The image processing circuit is constituted of an ASIC (Application Specific Integrated Circuit) or the like, and performs, for source image data that is the digital signal, white-balance (WB) adjustment, contour compensation, gamma correction, and other forms of image processing, while also, as needed, performing compression processing for compressing by a predetermined compression format (for example, JPEG or the like), decompression processing of compressed image data, and the like. Image data after processing is stored in the frame memory 13 or the image recording medium 16 on the basis of an operation of the operation unit 14 or the like.

Ordinarily, during imaging, when the user presses down on the release button (a shooting command button) of the operation unit 14, image data that has been captured and gone through image processing is outputted from the image processing unit 17. Predetermined auxiliary information is added to such image data, and the same is recorded, as an image file in exif or another format, in the image recording medium 16 with a predetermined filename having a sequence number that is sequentially incremented.

The HDMI command processing unit 18a is a processing unit that sends and receives a control command to/from the digital television 2 through the CEC line 4a. The control command can be, for example, an image forwarding request, an imaging forwarding termination (or interruption) request, or an image frame advance request. The control command may include a command adapted to perform a shooting or setting operation, such as releasing the digital camera 1.

The HDMI image output unit 18b transfers image data to the digital television 2 on the basis of an instruction from the CPU 10. The HDMI image output unit 18b reads out image data adapted to perform, for example, a slideshow, from the frame memory 13 or the image recording medium 16, and outputs the read-out image data to the HDMI image output unit 18b. The HDMI image output unit 18b transfers such image data via the HDMI cable 4 (the TMDS line 4b) to the digital television 2 (an HDMI image input unit 26b).

The digital camera 1 can detect whether or not the digital television 2 is physically connected via the HDMI cable 4 and can transfer images in a CEC mode, transfer images in a typical mode, or enter a control-interrupted mode in a case where the digital television 2 is physically connected via the HDMI cable 4 under control by the CPU 10.

The CEC mode is a mode for transferring image data in a state in which a control command sent from the digital television 2 via the CEC line 4a is activated in the HDMI command processing unit 18a, that is, in which the digital camera 1 can be controlled from the digital television 2. In the CEC mode, the user is, in a case where, for example, the digital television 2 is used to display a slideshow, capable of viewing an image while issuing image frame advance instructions or the like by, for example, operating the operation unit 14 of the remote controller 7.

The typical mode is a mode for transferring image data in a state in which a control command sent from the digital television 2 via the CEC line 4a is inactivated, that is, in a state in which the digital camera 1 cannot be controlled from the digital television 2. In the typical mode, the user is incapable of controlling the digital camera 1 from the digital television 2; image data is transferred to and displayed on the digital television 2 in accordance with control at the digital camera 1.

The interrupted mode is a mode in which the connection with the digital television 2 via the HDMI cable 4 enters a control-interrupted state, and is a mode of a state similar to a case where the HDMI cable 4 is not connected. Accordingly, in the interrupted mode, it is not possible to send and receive the control command via the HDMI cable 4, nor, of course, is it possible to transfer image data. Such modes are pre-set or are switched appropriately as needed.

The USB processing unit 19a is a processing unit adapted to send and receive a control signal, an image signal, or the like with the personal computer 3 in a case where the personal computer 3 is connected via the USB cable 5 to the digital camera 1.

The digital camera 1 can detect whether or not the personal computer 3 is physically connected via the USB cable 5 under control by the CPU 10. The digital camera 1 can selectively set a mode for normal communication in a case where the personal computer 3 is physically connected via the USB cable 5, and a mode for a similar state in a case where there is no connection. Such modes are pre-set or are switched appropriately as needed.

The digital television 2 has a CPU 20, a ROM 21, a RAM 22, a frame memory 23, an operation unit 24, a monitor unit (display screen) 25, an HDMI command processing unit 26a, and an HDMI image input unit 26b. The CPU 20 executes various forms of processing adapted to cause the digital television 2 to function, by the execution of a control program and the like stored in the ROM 21. The RAM 22 provides a memory area for work done when the CPU 20 or the like performs processing. A part of the memory area of the RAM 22 is used as the frame memory 23. The operation unit 24 is a button, switch, key, or the like operated by the user in order to input an instruction to the digital television 2 and is provided to the main body of the digital television 2 or is provided to the remote controller 7 of FIG. 1.

The HDMI command processing unit 26a is a processing unit that sends and receives a control command to/from the digital camera 1 via the CEC line 4a. The HDMI image input unit 26b acquires (receives) image data transferred from the digital camera 1 (the HDMI image output unit 18b) via the TMDS line 4b. The CPU 20 stores, in the frame memory 23, the image data received by the HDMI image input unit 26b. The image data stored in the frame memory 23 is converted into a form suitable for display by the monitor unit 25 and is displayed on the monitor unit 25. The monitor unit 25 is constituted of, for example, an LCD (Liquid Crystal Display) or a PDP (Plasma Display Panel) or other display means.

Figure 3:
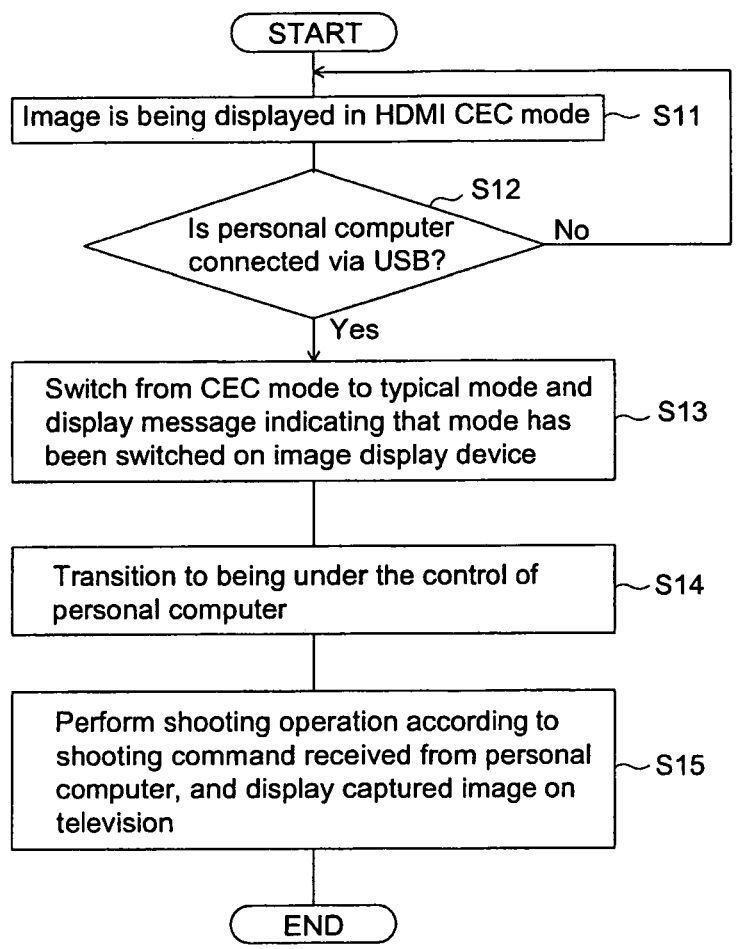
FIG. 3 is a flowchart illustrating a first process in the digital camera of the embodiment of the present invention.

Next, a description will be provided, with reference to the flowchart illustrated in FIG. 3, for the processing (a first process) in a case where the personal computer 3 is connected to the digital camera 1 via the USB cable 5 when the digital camera 1 is controlled in an operation mode (CEC mode) in which the cross-device control function is used from the digital television 2 connected via the HDMI cable 4.

First, it is assumed that the digital camera 1 is connected to the digital television 2 via the HDMI cable 4, images are being transferred in the CEC mode, and an image is being displayed (for example, a slideshow display) on the monitor unit 25 of the digital television 2. Herein, at a point in time where the digital camera 1 detects that the digital television 2 is connected via the HDMI cable 4, the digital camera 1 automatically is set to the CEC mode. However, rather than such mode setting being done automatically, it may be such that after the digital television 2 has been connected to the digital camera 1 via the HDMI cable 4, the user uses the operation unit 14 of the digital camera 1 to perform a predetermined operation whereby the CEC mode is set. In the CEC mode, the user can use the operation unit 14 of the remote controller 7 or the like of the digital television 2 to perform various settings, for example, starting/stopping the slideshow display, or advancing the frame.

In FIG. 3, while an image is displayed on the digital television 2 by the HDMI CEC mode (step S11), the digital camera 1 detects whether or not the personal computer 3 is connected via the USB cable 5 (step S12). In a case where no connection is detected (a case of "N"), the flow continues step S11, and in a case where a connection is detected (a case of "Y"), the digital camera 1 automatically switches from the CEC mode to the typical mode (step S13). At such a time, the monitor unit 25 of the digital television 2 displays a message indicating that the mode of the digital camera 1 has been switched from the CEC mode to the typical mode (step S13).

The switch to the typical mode causes the function of the HDMI command processing unit 18*a* to stop, and the digital camera 1 enters a state in which no control command from the digital television 2 is received (a state similar to a state in which the CEC line 4*a* is physically disconnected). At such a time, the state of the HDMI image output unit lab remains unchanged, and so when an image is sent from the digital camera 1, the relevant image can be displayed on the monitor unit 25 of the digital television 2.

In such a state, the user can no longer control the digital camera 1 even by operating the operation unit 24 of the remote controller 7 or the like. The user is notified of this fact by the display, on the monitor unit 25 of the digital television 2, of a message indicating that the mode of the digital camera 1 has been switched from the CEC mode to the typical mode. A possible example of such a message is the display of a character string such as "Mode switched to no remote operation" or the display of a design indicating similar content; in a case where an image is being displayed on the monitor unit 25, the display may be superimposed on the image.

Next, the digital camera 1 transitions to being under the control of the personal computer 3 in accordance with the USB protocol (step S14), and is controlled in accordance with an application executed on the personal computer 3. Herein, as the execution of, for example, a tethered shooting program on the personal computer 3, a shooting operation is performed in the digital camera 1 in accordance with a shooting command sent from the personal computer 3, and a captured image is transferred via the TMDS line 4*b* of the HUE cable 4 to the digital television 2 and then displayed on the monitor unit 25 thereof (step S15).

The execution of such a first process (automatic switching process) makes it possible to effectively prevent mutual interference of control in a case where both the HDMI and the USB are connected, and, by only stopping the HDMI CEC, also makes it possible for image transfer to continue and therefore allows for an image to be displayed on the monitor unit 25 of the digital television 2. Accordingly, the convenience for the user can be improved over the prior art.

Next, a description will be provided, with reference to the flowchart illustrated in FIG. 4, for the processing (the Second process) of a case where, when the digital camera 1 is controlled by the operation mode (CEC mode) using the cross-device control function from the digital television 2 connected via the HDMI cable 4, the personal computer 3 is connected to the digital camera 1 via the USB cable 5.

The assumption herein is similar to that of the case of the first process described above, and thus a description thereof has been omitted. In FIG. 4, while an image is displayed on the digital television 2 by the HDMI CEC mode (step S21), the digital camera 1 detects whether or not the personal computer 3 is connected via the USB cable 5 (step S22). In a case where no connection is detected (a case of "N"), the flow continues step S21, and in a case where a connection is detected (a case of "Y"), the rear monitor 15 of the digital camera 1 displays a selection screen for the selection of whether the HDMI takes priority or the USB takes priority, and prompts the user to make a selection (step S23). Next, a determination is made as to whether or not the user selection in step S23 is the USB (step S24); in a case where it is determined that the USB is selected (a case of "Y"), there is an automatic switch from the CEC mode to the typical mode (step S25). At such a time, the monitor unit 25 of the digital television 2 displays a message indicating that the mode of the digital camera 1 has been switched from the CEC mode to the typical mode.

The switch to the typical mode causes the function of the HDMI command processing unit 18*a* to stop, and the digital camera 1 enters a state in which no control command from the digital television 2 is received (a state similar to a state in which the CEC line 4*a* is physically disconnected). At such a time, the state of the HDMI image output unit 18*b* remains unchanged, and so when an image is sent from the digital camera 1, the relevant image can be displayed on the monitor unit 25 of the digital television 2. In such a state, the user can no longer control the digital camera 1 even by operating the operation unit 24 of the remote controller 7 or the like. The user is notified of this fact by the display, on the monitor unit 25 of the digital television 2, of a message indicating that the mode of the digital camera 1 has been switched from the CEC mode to the typical mode. A possible example of such a message is the display of a character string such as "Mode switched to no remote operation" or the display of a design indicating similar content; in a case where an image is being displayed on the monitor unit 25, the display may be superimposed on the image.

Next, the digital camera 1 transitions to being under the control of the personal computer 3 in accordance with the USB protocol (step S26), and is controlled by an application executed on the personal computer 3. Herein, as the execution of, for example, a tethered shooting program on the personal computer 3, a shooting operation is performed in the digital camera 1 in accordance with a shooting command sent from the personal computer 3, and a captured image is transferred via the TMDS line 4*b* of the HDMI cable 4 to the digital television 2 and then displayed on the monitor unit 25 thereof (step S27).

In step S24, in a case Where the USB is not selected, that is, in a case where the HDMI is selected (a case of "N"), the digital camera 1 enters a state in which the HDMI remains in an unchanged state (in a state in which the CEC mode remains) and the USB is not made to function (a state similar to an unconnected state) (step S28). Such control can return a command corresponding to an inexecutable command to a command received via the USB or disregard the relevant command.

The execution of such a second process (selection switching process) makes it possible to effectively prevent mutual interference of control in a case where both the HDMI and the USB are connected, and, by allowing processing that follows the user's intentions, can therefore improve the convenience for the user over that of the prior art. Further, even in a case where the selection gives priority to the USB, only the HDMI CEC is stopped, and image transfer is allowed to continue, so it becomes possible to display an image on the monitor unit 25 of the digital television 2, allowing for an improvement in the convenience for the user over that of the prior art.

However, in the second process described above, in a case where the selection gives priority to the USB, the switch from the CEC mode to the typical mode only stops the HDMI CEC and allows image transfer to continue, but there may also be a switch from the CEC mode to the interrupted mode, entering a state in which the HDMI is completely interrupted.

Next, a description will be provided for the processing (the third process) of a case where, when the digital camera 1 is connected to the personal computer 3 via the USB cable 5 and is controlled by the personal computer 3 in accordance with the USB protocol, the digital television 2 is connected to the digital camera 1 via the HDMI cable 4.

First, it is assumed that the digital camera 1 is connected to the personal computer 3 via the USB cable 5 and is controlled in accordance with an application executed on the personal computer 3 in accordance with the USB protocol. In a case where, for example, a tethered shooting program is executed on the personal computer 3, a shooting operation is performed in the digital camera 1 in accordance with a shooting command sent from the personal computer 3.

Thus, when the digital camera 1 is under the control of the personal computer 3, the digital camera 1 detects whether or not there is a connection to the digital television 2 via the HDMI cable 4; in a case where a connection is detected, the digital camera 1 is set to the typical mode. That is, in the third process, when the digital camera 1 is connected to the digital television 2, a connection in the CEC mode is prohibited, and the connection is made by the typical mode.

At such a time, in the digital television 2, the monitor unit 25 displays a message indicating that the digital camera 1 is connected in the typical mode. Further, because the connection is in the typical mode, the function of the HDMI command processing unit 18a is stopped, and the digital camera 1 enters a state in which a control command from the digital television 2 will not be received. On the other hand, because the function of the HDMI image output unit 18b is not stopped, when an image is sent from the digital camera 1, the relevant image can be displayed on the monitor unit 25 of the digital television 2.

Executing such a third process makes it possible to effectively prevent mutual interference of control in a case where both the HDMI and the USB are connected, and also makes it possible to continue control in accordance with the USB protocol. Further, because only the HDMI CEC is stopped and image transfer is allowed, an image can be displayed on the monitor unit 25 of the digital television 2, allowing for an improvement in the convenience for the user over that of the prior art.

However, in the embodiments described above, the configuration is such that the control program adapted to perform the first process to third process is pre-stored in the ROM 11 of the digital camera 1, but may also be such that the program is downloaded via the Internet or other network and embedded into the digital camera 1, whereby the digital camera 1 is made to function so as to be able to perform the above-described first process to third process.

That is, when the digital camera 1 is in a state permitting control in the CEC mode from the digital television 2 connected via the HDMI cable 4, the control program according to the first process executes, in the digital camera 1, the control steps of prohibiting the use of the CEC mode whenever the personal computer 3 is connected to the digital camera 1 via the USB cable 5.

Further, when the digital camera 1 is in a state permitting control in the CEC mode from the digital television 2 connected via the HDMI cable 4, then whenever the personal computer 3 is connected to the digital camera 1 via the USB cable 5, the control program according to the second process executes, in the digital camera 1, a selection step adapted to select Whether to give priority to the HDMI or to give priority to the USB, and also, in a case where the selection in the selection step gives priority to the USB, a control step of prohibiting the use of the CEC mode.

Further, when the digital camera 1 is connected to the personal computer 3 via the USB cable 5, the control program according to the third process executes, in the digital camera 1, a control step of prohibiting the use of the CEC mode whenever the digital television 2, which can be connected in the CEC mode via the HDMI cable 4, is connected to the digital camera 1.

The above-described embodiments have been recited in order to facilitate understanding of the present invention, and are not recited in order to limit the present invention. Accordingly, in effect, each element disclosed in the above-described embodiments also includes all design changes and equivalents falling within the technical scope of the present invention.

The invention claimed is:

1. An electronic device provided with a general-purpose serial bus interface, and a multimedia interface having a cross-device control function, the electronic device comprising:
    a control unit that prohibits the use of the cross-device control function whenever an external device is connected to the electronic device via the general-purpose serial bus interface during a state permitting control by the cross-device control function from an image display device connected to the electronic device via the multimedia interface, wherein the external device is different from the image display device.

2. The electronic device according to claim 1, wherein the control unit, in addition to prohibiting the use of the cross-device control function, also enters a state permitting image data to be sent to the image display device connected via the multimedia interface.

3. The electronic device according to claim 2, wherein whenever the external device is connected via the general-purpose serial bus interface during a state permitting control by the cross-device control function from the image display device connected via the multimedia interface, the control unit then switches from a first mode of a state in which the use of the cross-device control function is permitted and in which image data can be sent to the image display device, to a second mode of a state in which the use of the cross-device control function is prohibited and in which image data can be sent to the image display device.

4. The electronic device according to claim 1, wherein whenever the image display device is connected via the multimedia interface while the external device is connected via the general-purpose serial bus interface, the control unit prohibits the use of the cross-device control function.

5. The electronic device according to claim 1, wherein the multimedia interface is an HDMI, and the cross-device control function is a CEC function.

6. An electronic device provided with a general-purpose serial bus interface, and a multimedia interface having a cross-device control function, the electronic device comprising:
    a control unit that prohibits the use of the cross-device control function whenever an image display device is connected to the electronic device via the multimedia interface while an external device is connected to the electronic device via the general-purpose serial bus interface, wherein the external device is different from the image display device.

7. A non-transitory computer-readable medium having instructions that, when executed on a computer, causes the computer to execute a method, the method comprising:
    whenever an external device is connected to the electronic device via a general-purpose serial bus interface during a state permitting control by a cross-device control function from an image display device connected to the electronic device via a multimedia interface having the cross-device control function, a control step of prohibiting the use of the cross-device control function, wherein the external device is different from the image display device.

8. A non-transitory computer-readable medium having instructions that, when executed on a computer, causes the computer to execute a method, the method comprising:

whenever an image display device is connected to the electronic device via a multimedia interface having a cross-device control function while an external device is connected to the electronic device via a general-purpose serial bus interface, a control step of prohibiting the use of the cross-device control function, wherein the external device is different from the image display device.

* * * * *